(12) United States Patent
Tokunaga et al.

(10) Patent No.: US 10,895,203 B2
(45) Date of Patent: Jan. 19, 2021

(54) GENERAL PURPOSE ENGINE

(71) Applicant: Kawasaki Jukogyo Kabushiki Kaisha, Kobe (JP)

(72) Inventors: Shozo Tokunaga, Kakogawa (JP); Toru Minami, Kakogawa (JP); Masahiro Ueno, Kakogawa (JP)

(73) Assignee: KAWASAKI JUKOGYO KABUSHIKI KAISHA

( * ) Notice: Subject to any disclaimer, the term of this patent is extended or adjusted under 35 U.S.C. 154(b) by 36 days.

(21) Appl. No.: 16/280,827

(22) Filed: Feb. 20, 2019

(65) Prior Publication Data

US 2019/0292997 A1    Sep. 26, 2019

(30) Foreign Application Priority Data

Mar. 23, 2018   (JP) ................. 2018-055896

(51) Int. Cl.
| | | |
|---|---|---|
| *F02D 9/02* | (2006.01) | |
| *F02M 35/10* | (2006.01) | |
| *F01N 5/02* | (2006.01) | |
| *F01N 13/14* | (2010.01) | |
| *F01P 5/04* | (2006.01) | |
| *F01P 7/02* | (2006.01) | |
| *F03G 7/06* | (2006.01) | |
| *F01N 1/00* | (2006.01) | |
| *F02M 1/10* | (2006.01) | |

(52) U.S. Cl.
CPC ................. *F02D 9/02* (2013.01); *F01N 1/00* (2013.01); *F01N 5/02* (2013.01); *F01N 13/14* (2013.01); *F01P 5/04* (2013.01); *F01P 7/02* (2013.01); *F02M 1/10* (2013.01); *F02M 35/10144* (2013.01); *F02M 35/10255* (2013.01); *F03G 7/06* (2013.01); *F02D 2009/0222* (2013.01)

(58) Field of Classification Search
CPC .... F01N 1/00; F01N 5/02; F02M 1/10; F02M 35/10255; F02D 9/02; F02D 2009/0222
See application file for complete search history.

(56) References Cited

U.S. PATENT DOCUMENTS

| | | | |
|---|---|---|---|
| 7,284,522 B2 | 10/2007 | Kamimura et al. | |
| 2005/0022798 A1* | 2/2005 | Roth | F02M 1/10 123/676 |

(Continued)

FOREIGN PATENT DOCUMENTS

| | | |
|---|---|---|
| JP | 2005-264819 | 9/2005 |
| JP | 2012-077637 | 4/2012 |

*Primary Examiner* — Audrey K Bradley

(57) ABSTRACT

A general purpose engine includes: a cooling fan fixed to an engine rotary shaft; a muffler to silence exhaust gases; a muffler covering to cover the muffler; and an auto choke device to control an opening of a choke valve in an air intake passage by the utilization of heat evolved from the muffler. The auto choke device includes: a drive source, which is fitted to the muffler covering in a non-contact fashion to the muffler and exposed to an outer surface of the muffler covering; and a link member to connect between the drive source and the choke valve. The drive source includes a bracket, which is fitted to the muffler covering, and a bimetal fitted inside the bracket. The bracket includes a heat shield extending towards an inner side of the muffler covering, and the heat shield blocks out a cooling wind then flowing towards the bimetal.

9 Claims, 5 Drawing Sheets

(56) References Cited

U.S. PATENT DOCUMENTS

| | | | |
|---|---|---|---|
| 2005/0199217 A1 | 9/2005 | Kamimura et al. | |
| 2006/0065480 A1* | 3/2006 | Leehaug | F01N 13/18 181/283 |
| 2009/0301072 A1* | 12/2009 | Sotiriades | F02M 1/10 60/320 |
| 2011/0315133 A1* | 12/2011 | Drew | F01N 13/1888 123/676 |
| 2012/0119394 A1* | 5/2012 | Takesue | F02M 1/10 261/39.3 |
| 2012/0247423 A1* | 10/2012 | Furuya | F01N 5/02 123/337 |
| 2014/0216370 A1* | 8/2014 | Ichihashi | H02K 9/06 123/41.65 |

* cited by examiner

CYLINDER SIDE

GENERAL PURPOSE ENGINE

CROSS REFERENCE TO THE RELATED APPLICATION

This application is based on and claims Convention priority to Japanese patent application No. 2018-055896, filed Mar. 23, 2018, the entire disclosure of which is herein incorporated by reference as a part of this application.

BACKGROUND OF THE INVENTION

Field of the Invention

The present invention relates to a general purpose engine equipped with an auto choke device to control a choke valve in an intake passage by the utilization of heat evolved from a muffler.

Description of Related Art

In the general purpose engine, the use of an auto choke device has been known for the purpose of enhancing the air-fuel mixing ratio of the air-fuel mixture (See, for example, the JP Laid-open Patent Publications No. 2005-264819 and No. 2012-077637). According to the JP Laid-open Patent Publication No. 2005-264819, the opening of a choke valve is adjusted by controlling a stepping motor on the basis of the signal fed from a temperature sensor fitted to the engine. On the other hand, according to the JP Laid-open Patent Publication No. 2012-077637, a bimetal as a drive source is fitted to a muffler through a bracket, and the opening of the choke valve is adjusted by the use of the bimetal.

Since the JP Laid-open Patent Publication No. 2005-264819 requires the use of the temperature sensor, the stepping motor and a device for controlling them, the number of component parts is increased, and thus, the structure is rendered to be complicated. On the other hand, in the JP Laid-open Patent Publication No. 2012-077637, since the bimetal is fitted to the muffler as a drive source, the temperature of the drive source is apt to increase. Also, since the bimetal is covered by a muffler covering, the need is realized to remove the muffler covering in the case of access to the drive source, and therefore, the maintenance is not good.

SUMMARY OF THE INVENTION

In view of the foregoing, the present invention has been devised to provide a general purpose engine of a type equipped with an auto choke device that is simple in structure and excellent in maintenance.

In order to accomplish the foregoing object, a general purpose engine according to the present invention comprises: a cooling fan fixed to an engine rotary shaft; a muffler to silence exhaust gases; a muffler covering to cover the muffler; and an auto choke device to control an opening of a choke valve in an air intake passage by the utilization of heat evolved from the muffler. The auto choke device comprises: a drive source, which is fitted to the muffler covering in a non-contact fashion to the muffler and exposed to an outer surface of the muffler covering; and a link member to connect between the drive source and the choke valve. The drive source includes a bracket fitted to the muffler covering and a bimetal fitted inside the bracket, and the bracket includes a heat shield extending towards an inner side of the muffler covering and configured to block out a cooling wind then flowing towards the bimetal. The term "inner side of the muffler covering" hereinabove referred to and hereinafter referred to should be understood as meaning a direction from the muffler covering to the muffler.

According to the foregoing construction, the auto choke device is constructed with the drive source, the rink member and the choke valve, and therefore, the structure is simple. Also, the drive source is fitted to the muffler covering and is not in contact with the muffler then being of a high temperature. Accordingly, a temperature rise of the drive source is suppressed. Since the drive source is fitted to the muffler covering, fitting of the muffler covering to the engine allows the drive source, too, to be fitted to the engine, and therefore, the assemblability can be increased. Since the drive source is exposed to the outer surface of the muffler covering, removal of the fan covering makes the drive source and the link member to be accessed, and hence, the maintenance is good. In addition, since the heat shield serves to interrupt the flow of the cooling wind towards the bimetal, a space to accommodate hear properly is formed, and thus, the operation of the bimetal is rendered to be stabilized.

In the present invention, the heat shield referred to above may extend towards a gap between the muffler and a cylinder head. According to this construction, the heat shielding effect can be increased by lengthening the heat shield sufficiently. In this case, the heat shield may be so configured as to guide the cooling wind towards a point of connection between the muffler and the cylinder head. According to this construction, owning to the heat shield, the point of connection between the muffler and the cylinder head can be cooled while stabilization of both of the operation and the temperature of the bimetal are accomplished.

In the present invention, the bracket referred to above may be fastened removably to the muffler covering by means of a fastening member in a condition that the bracket is exposed from the outer surface of the muffler covering. According to this construction, since the drive source is removable, the maintenance is good. Also, removal of the drive source is effective to change to the engine of a type having no auto choke function, and the muffler covering can therefore be concurrently used on those two types.

In the present invention, the bimetal and the link member may be rotatably connected together by means of a link lever and, also, the link member may be engaged with the link lever. According to this construction, the drive source and the choke valve can be connected together merely by engaging the link member with the link lever, and therefore, the assemblability and maintenance of the auto choke device are good.

In the present invention, the engine rotary shaft may extend in a vertical direction. According to this construction, since the drive source and the link member can be disposed above the engine, access from above to the drive source and the link member is rendered to be easy, and the maintenance of the auto choke device is good. In this case, the fan covering to cover an upper surface of the engine may be made of resin material. According to this construction, an undesirable temperature rise in the drive source can be suppressed, and therefore, the fan covering of resin material can be protected from heat damages.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
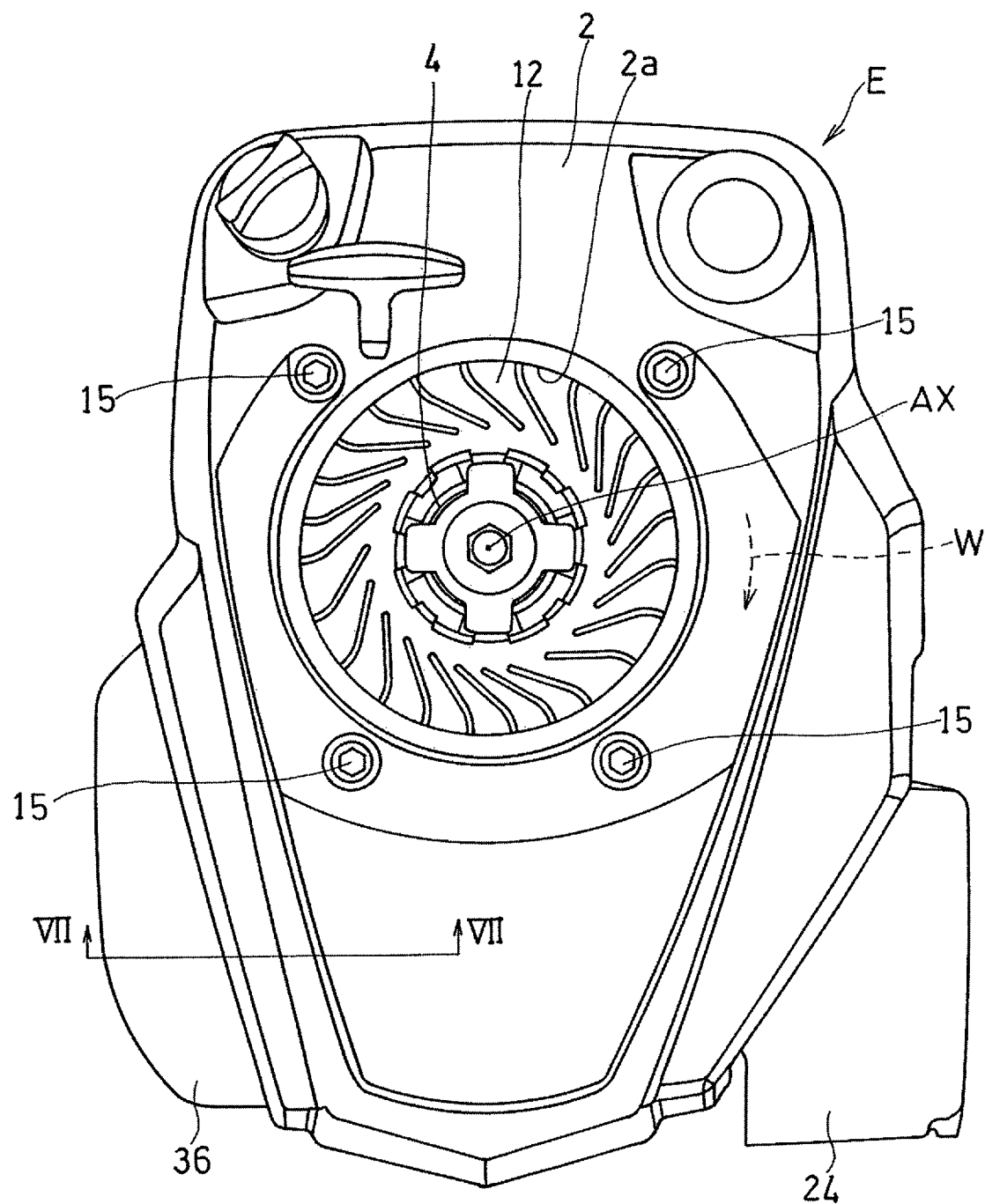
FIG. 1 is a top view showing a general purpose engine equipped with an auto choke device designed in accordance with a first preferred embodiment of the present invention.

A preferred embodiment of the present invention will now be described in detail with reference to the accompanying drawings. FIG. 1 illustrates a top view of a general purpose engine E equipped with an auto choke device designed in accordance with a first preferred embodiment of the present invention. The general purpose engine E is applied to a compact work machine such as, for example, a self-propelled lawn mower. It is, however, to be noted that the application of the general purpose engine may not be necessarily limited thereto and may be applied to any other machine or device than the lawn mower.

The general purpose engine E employed in the practice of the embodiment now under discussion is a vertical type engine having its engine rotary shaft AX extending in an up and down direction or vertical direction. It is, however, to be noted that the general purpose engine of the present invention may not be limited to the vertical type engine. The engine E has an upper surface covered by a fan covering 2 made of resin material. It is also to be noted that the material for the fan covering 2 may not be necessarily limited to resin.

Figure 2:
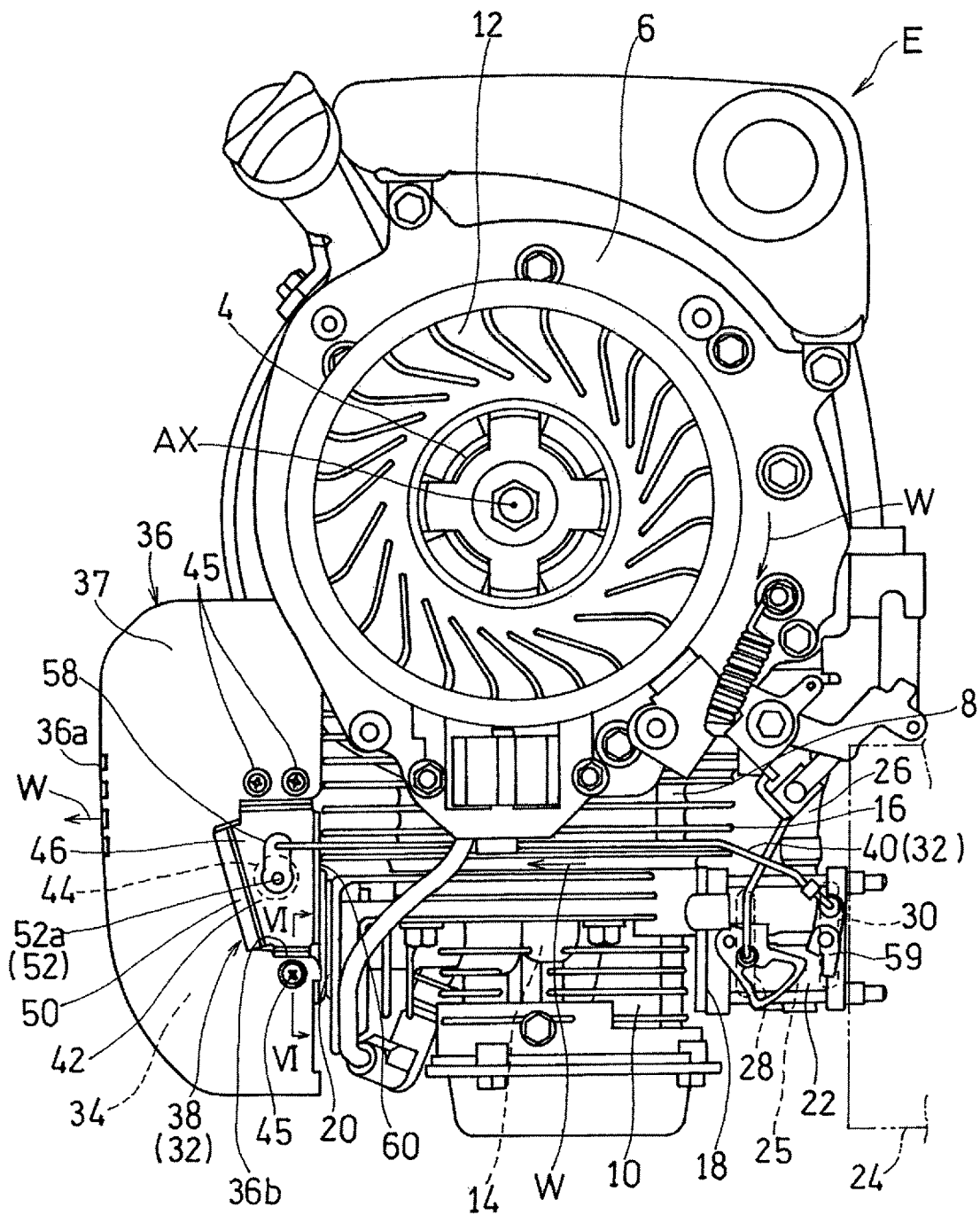
FIG. 2 is a top view showing the general purpose engine with a fan covering removed.

FIG. 2 illustrates a plan view of the general purpose engine E with the fan covering 2 removed therefrom. The engine E includes: a crankshaft 4 forming the engine rotary shaft AX; a crankcase 6 to rotatably support the crankshaft 4; a cylinder 8 protruding from the crankcase 6 in a direction parallel to the horizontal direction; and a cylinder head 10 protruding from the cylinder 8 in the direction parallel to the horizontal direction.

The crankshaft 4 has one end (lower end), to which a work tool cutting blade (not shown) fixed, and the other end (upper end) to which a cooling fan 12 is fixed. When the crankshaft 4 rotates, the work tool and the cooling fan 12 are rotated integrally.

As shown in FIG. 1, the fan covering 2 is removably fitted to the crankcase 6 (FIG. 2) by means of a plurality of bolts 15, and is provided with an air intake opening 2a above the cooling fan 12. When the cooling fan 12 rotates, air is introduced through the air intake opening 2a, and a cooling wind W is generated consequently. It is to be noted that, although not shown in FIG. 1, the air intake opening 2a is provided with a screen for inhibiting ingress of foreign matter.

Within the cylinder 8 and the cylinder head 10, both shown in FIG. 2, a combustion chamber 14 is formed. Each of the cylinder 8 and the cylinder head 10 has its outer surfaces formed with respective pluralities of cooling fins 16. An air intake port 18 is formed on one lateral side (right side as viewed in FIG. 1) of the cylinder head 10, and an exhaust port 20 is formed on the other lateral side (left side as viewed in FIG. 2) of the cylinder head 10.

The air intake port 18 is fluid connected with a carburetor 22, and an air cleaner 24 is in turn fluid connected with the carburetor 22. An air intake passage 25 is formed within the carburetor 22. The air intake passage 25 is fluid connected with a fuel supply tube 26. When the engine E is started, air, which has been filtered through the air cleaner 24, is introduced into the air intake passage 25, and is subsequently mixed with fuel injected from the fuel supply tube 26 to thereby form an air-fuel mixture. This air-fuel mixture is introduced from the air intake port 18 into the combustion chamber 14.

The air intake passage 25 has a throttle valve 28 and a choke valve 30 installed therein, which choke valve 30 is positioned on an upstream side of the throttle valve 28 with respect to the direction of flow of the air therethrough. On a downstream side of the chose valve 30, the fuel supply tube 26 injects the fuel into an upstream side of the throttle valve 28. The throttle valve 28 and the choke valve 30 are operable to adjust the amount of air then flowing through the air intake passage 25. The opening of throttle valve 28 can be adjusted by a governor 29 (shown in FIG. 3), to allow the engine rotational number to attain a fixed value. The opening of the choke valve 30 is controlled by an auto choke device 32 as will be described in detail later.

The exhaust port 20 has a muffler 34 fluid connected therewith for silencing sounds of exhaust gases. The muffler 34 is covered by a muffler covering 36. The muffler covering 36 is removably fitted to the crankcase 6 by means of fastening members (not shown) such as, for example, bolts. The muffler covering 36 employed in the practice of the embodiment now under discussion covers an outer surface of the muffler 34 excluding a lower surface and a lateral side surface (right side surface as viewed in FIG. 1) on the cylinder head side. The air-fuel mixture introduced from the air intake port 18 is burned within the combustion chamber 14, and the resultant exhaust gases are introduced from the exhaust port 20 into the muffler 34. The exhaust gases are, after the sounds of flow of the exhaust gases have been silenced within the muffler 34, discharged to the outside.

When the engine E is started, the cooling wind W generated by the cooling fan 12 is guided by the fan covering 2 (shown in FIG. 1), and flows towards the cylinder 8 and the cylinder head 10. Then, the cooling wind W is further guided by the fan covering 2 (shown in FIG. 1), and flows towards the muffler 34 after having been flowed along the cooling fins 16 to cool the cylinder 8 and the cylinder head 10. The cooling wind W is, after having flowed in between the muffler 34 and the muffler covering 36 to cool the muffler 34, discharged to the outside from slits 36a which are formed in the muffler covering 36.

The muffler covering 36 is provided with the auto choke device 32 referred to previously. The auto choke device 32 makes use of heat evolved from the muffler 34 to control the opening of the choke valve 30. More specifically, the auto choke device 32 includes: a drive source 38 fitted to the muffler covering 36; and a link member 40 connecting the drive source 38 and the choke valve 30 with each other. The drive source 38 is fitted to the muffler covering 36 in a non-contact fashion to the muffler 34, and is exposed on an upper surface of the muffler covering 36.

Figure 3:
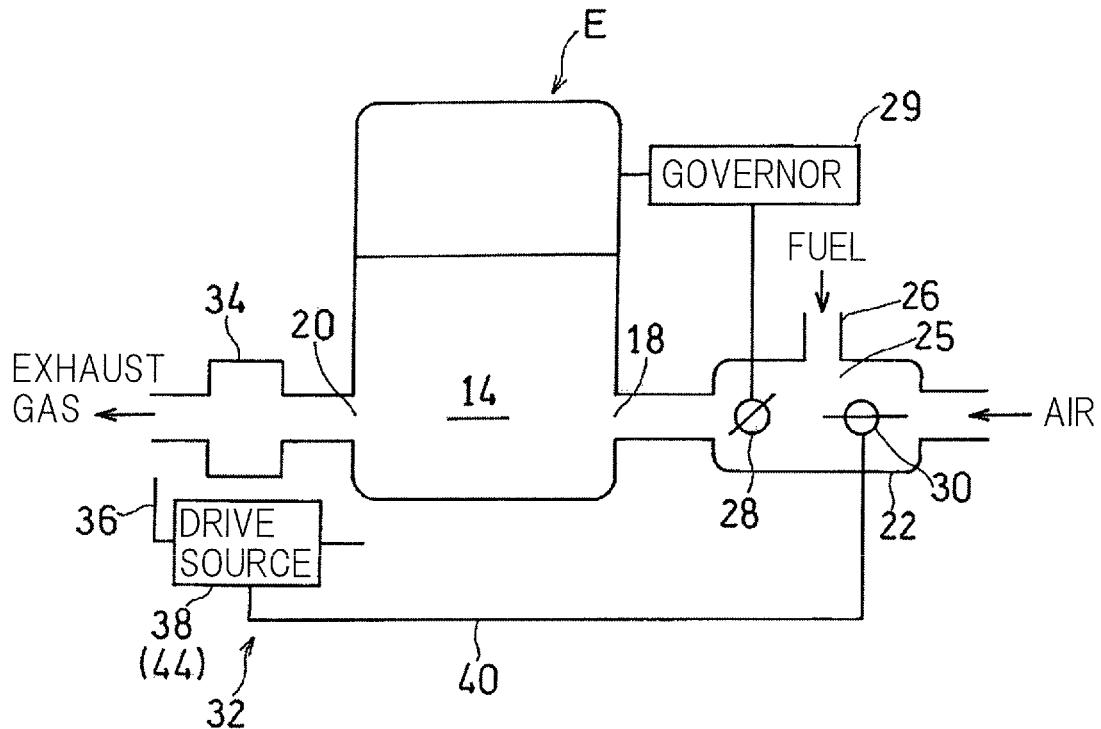
FIG. 3 is a conceptual diagram showing a system structure of the auto choke device.

As shown in FIG. 3, the auto choke device 32 selectively open and close the choke valve 30 through the link member 40 by the utilization of a power of the drive source 38. For the drive source 38, a thermostat 44 is provided. In other words, the choke valve 30 is set to a fully closed positon at a temperature lower than a predetermined lower limit temperature, and as the temperature exceeds over the lower limit temperature the choke valve 30 is gradually moved towards a fully opened positon which is attained when the temperature attains a predetermined upper limit value. Accordingly, when the engine E is to be started under a condition in which the temperature is low, the amount of the air introduced into the carburetor 22 decreases, and thus, the air-fuel mixture ratio is rendered to be enriched. As a results, even under a low temperature condition, the engine E can be easily started.

The details of the drive source 38 will now be discussed. The drive source 38 shown in FIG. 2 includes a bracket 42, fitted to the muffler covering 36, and a bimetal (thermostat) 44 fitted inside the bracket 42. The bracket 42 is removably fastened to an upper wall 37 of the muffler covering 36 by means of fastening members 45 such as, for example, threaded members. More specifically, the upper wall 37 of the muffler covering 36 is formed with a cutout portion 36b, and the bracket 42 referred to above is disposed within this cutout portion 36b. The bracket 42 is fitted at the site of the upper wall 37 of the muffler covering 36, which site is proximate to the cylinder 8 and the cylinder head 10 and, more particularly, at the site proximate to the exhaust port 20.

Figure 4:
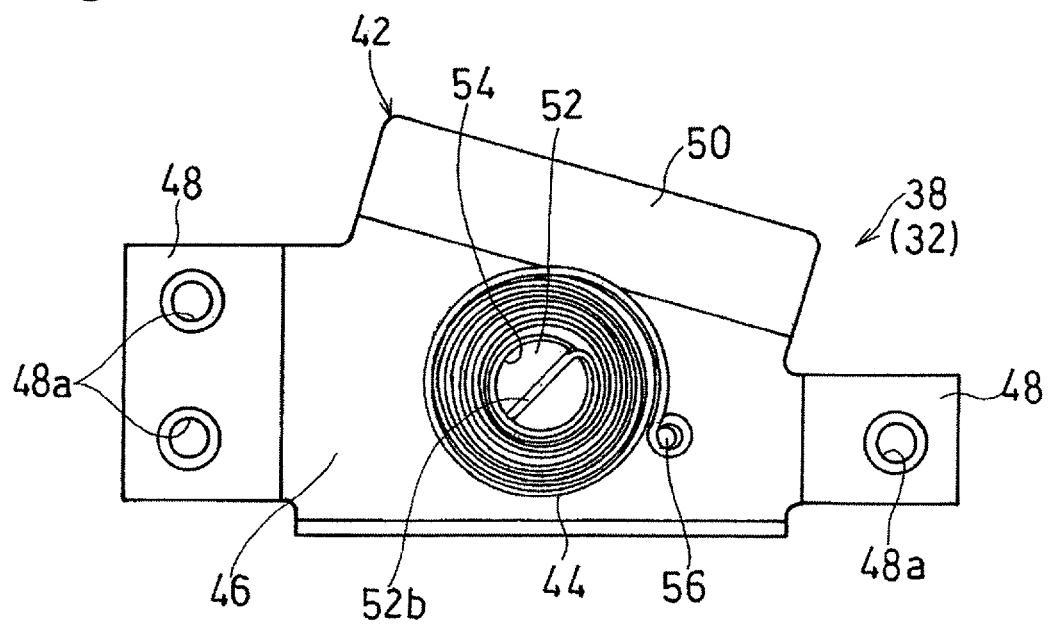
FIG. 4 is a rear view showing a drive source for the auto choke device.
Figure 5:
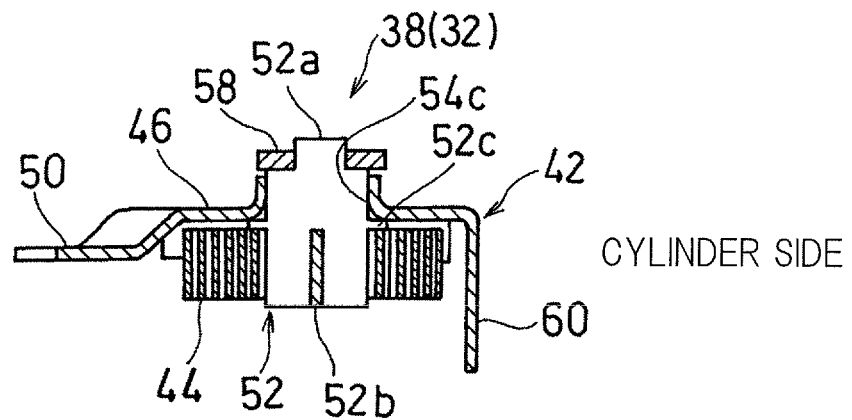
FIG. 5 is a longitudinal sectional view showing the drive source.

FIG. 4 illustrates a rear view of the drive source 38 as viewed from below, and FIG. 5 illustrates a longitudinal sectional diagram showing the drive source 38. As shown in FIG. 4, the bracket 42 is formed by bending a sheet metal, and includes: a main body 46 to which the bimetal 44 is fitted; fitting lugs 48 and 48 provided on respective sides (left and right sides as viewed in FIG. 4) of the main body 46; and an engagement lug 50 extending from the main body 46 in a direction opposite to the cylinder side.

The man body 46 is formed with a stud insertion hole 54 into which a stud member 52 is inserted. The main body 46 is also formed with a pin 56 extending in a direction inwardly of (towards the muffler 34) the muffler covering 36.

As shown in FIG. 5, the stud member 52 has one end surface (upper end surface) formed with an engagement projection 52a, and also has the other end surface (lower end surface) depressed axially inwardly thereof to define a radially extending slit 52b. Also, an axially intermediate portion of an outer peripheral surface of the stud member 52 (i.e., a portion of an outer peripheral surface of the stud member 52 with respect of a vertical direction) is formed with a collar shaped flange portion 52c that extends radially of the stud member 52.

The stud member 52 is inserted from below into the stud insertion hole 54 defined in the main body portion 46 of the bracket 42. The engagement projection 52a on the upper end of the stud member 52 is engaged with a link lever 58, and the link lever 58 is swaged or caulked to the engagement projection 52a to avoid separation of the link lever 58 from the engagement projection 52a. With the stud member 52 clamped by and between the flange portion 52c and the link lever 58 in this manner, the stud member 52 is rotatably supported by the main body portion 46.

The bimetal 44 functions as a thermostat as hereinbefore described. The bimetal 44 employed in the practice of the embodiment now under discussion is so selected as to linearly change within a range of −20 to 180° C. so that the choke valve 30 can be fully closed at 0° C. and fully opened at 40° C. In other words, in the practice of the embodiment now under discussion, the range of use of the bimetal 44 (thermostat) is within the range of 0 to 40° C. However, the range of use of the bimetal 44 may not be necessarily limited thereto and any arbitrarily chosen range can be set. Material for the bimetal 44 can also be arbitrarily chosen if the desired range of use can be measured.

The bimetal 44 is disposed in the form of a spiral spring (flat spiral spring). Specifically, the bimetal 44 in the form of an elongated plate shape has one end inserted into the slit 52b and is then retained. On the other hand, the other end of the bimetal 44 is engaged with the pin 56. Accordingly, the stud member 52 rotates as a result of change in shape of the bimetal 44.

Figure 6:
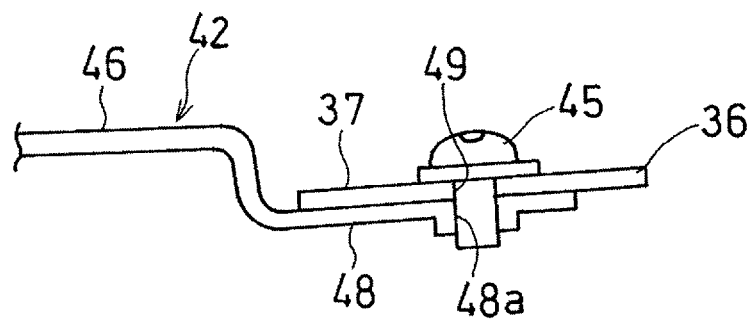
FIG. 6 is a cross sectional view taken along the line VI-VI in FIG. 2.

As shown in FIG. 6, the fitting lugs 48 of the bracket 42 are fitted to an inner surface of the upper wall 37 of the muffler covering 36. Specifically, the fitting lugs 48 of the bracket 42 is formed with a fitting hole 48a, in the form of, for example, a threaded hole, to which a fastening member 45 is fitted, and the muffler covering 36 is formed with an insertion hole 49.

As shown in FIG. 2, the fitting lugs 48 and the engagement lug 50 both in the bracket 42 are brought into contact with an inner side (lower side) of the upper wall of the muffler covering 36, and the main body portion 46 of the bracket 42 is positioned within the cutout portion 36b in the muffler covering 36. Under this condition, the bracket 42 is fastened from above to the fitting lugs 48 of the bracket 42 by means of the fastening member 45 which is inserted through the insertion hole 49 in the muffler covering 36 and is then screwed to the fitting lug 48 of the bracket 42. In the practice of the embodiment now under discussion, the number of 0 the fastening member 45 is three, but the number of the fastening member 45 is not necessarily limited to that. At this time, since the engagement lug 50 is employed, the position of the bracket 42 can be stabilized and the workability can be increased.

The link lever 58 has its base end portion fixed to the engagement projection 52a, and one end portion 40a of the link member 40 is engaged with a tip end portion of the link lever 58. In other words, the bimetal 44 and the link member 40 are rotatably connected together through the link lever 58. The other end portion 40b of the link member 40 is connected with a valve side link lever 59. The opening of the choke valve 30 is adjusted by the pivotal movement of the valve side link lever 59.

As hereinbefore described, the stud member 52 rotates as the temperature of the bimetal 44 changes, and the link lever 58 that is fixed to the stud member 52 rotates, too. When the link lever 58 rotates, the valve side link lever 59 too rotates through the link member 40, and the opening of the choke valve 30 is adjusted consequently.

Figure 7:
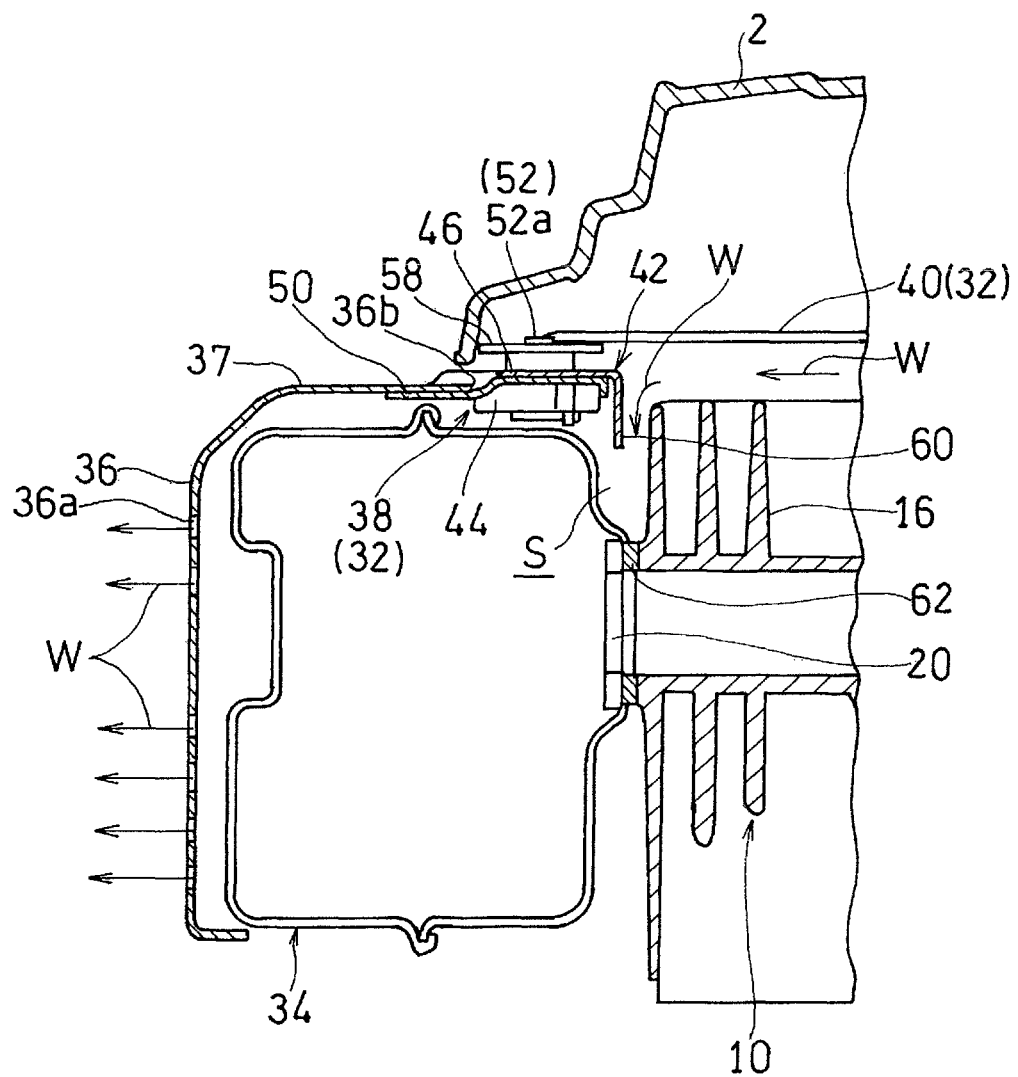
FIG. 7 is a cross sectional view taken along the line VII-VII in FIG. 1.

A heat shield 60 is formed on a cylinder side of the main body portion 46 of the bracket 42. The heat shield 60 employed in the practice of the embodiment now under discussion is, as shown in FIG. 7, formed by bending the main body portion 46 downwardly. Specifically, the heat shield 60 extends towards an inner side (downwardly, as is the case of the embodiment now under discussion) of the muffler covering 36.

The heat shield 60 extends towards a gap S delimited between the muffler 34 and the cylinder head 10. Specifically, the heat shield 60 extends towards a point of connection 62 between the muffler 34 and the cylinder head 10.

The heat shield 60 is so constructed as to block out or interrupt the cooling wind W flowing towards the bimetal 44 during the operation. In other words, the heat shield 60 has a lower end edge positioned downwardly of a lower end edge of the bimetal 44. Accordingly, the bimetal 44 is covered from a cylinder head side by the heat shield 60, and hence, the bimetal 44 cannot be viewed from the cylinder head side. In the practice of the embodiment now under discussion, the heat shield 60 is so designed as to guide the cooling wind W towards the point of connection 62 between the muffler 34 and the cylinder head 10.

The auto choke device 32 is fitted to the muffler covering 36 without contacting the muffler 34. In other words, both of the bracket 42 and the bimetal 44 are disposed in a fashion with a sufficient clearance developed relative to the muffler 34 and the cylinder head 10, and hence, the bracket 42 and the bimetal 44 are not in connect with the muffler 34 and the cylinder head 10.

According to the construction described above, the auto choke device 32 shown in FIG. 2 is constituted by the drive source 38, the link member 40 and the choke valve 30. Accordingly, none of the temperature sensor and the motor for controlling the chokes valve is needed, and the structure is therefore simplified. Also, since the drive source 38 shown in FIG. 7 is fitted to the muffler covering 36 and does not contact the high temperature muffler 34 and the cylinder head 10, an undesirable temperature rise of the drive source 38 can be suppressed. In view of the foregoing, the operation of the auto choke device 32 can be stabilized. Although the fan covering 2 employed in the practice of the embodiment hereinabove discussed has been described as made of resin material, the fan covering 32 is protected from thermal damage since the temperature rise of the drive source 38 is suppressed.

Since the drive source 38 shown in FIG. 2 is fitted to the muffler covering 36, fitting of the muffler covering 36 to the crankcase 6 allows the drive source 38, too, to be fitted to the engine, and therefore, the assemblability can be increased. Also, the drive source 38 is exposed to the outer surface of the muffler covering 36. Accordingly, removal of the fan covering 2 allows the drive source 38 and the link member 40 to be accessed easily, and hence, the maintenance can readily be accomplished. Also, the cooling wind W is prevented, by the heat shield 60 shown in FIG. 7, from reaching the bimetal 44. Accordingly, a space for accommodating heat properly is formed around the bimetal 44, and hence, the operation of the bimetal 44 is stabilized.

The heat shield 60 extends towards the gap S delimited between the muffler 34 and the cylinder head 10. Accordingly, the heat insulating effect can be increased by lengthening the heat shield 60. Also, the heat shield 60 is so configured as to guide the cooling wind W towards the connection point 62 between the muffler 34 and the cylinder head 10. Accordingly, the operation of the bimetal 44 can be stabilized by stabilizing the temperature around the bimetal 44 by use of the heat shield 60. The point of connection 62 between the muffler 34 and the cylinder head 10 tends to be heated to a high temperature, since the cooling wind W hardly flow. According to the above-mentioned construction, guiding the cooling wind W by means of the heat shield makes it possible to effectively cool the point of connection 62 between the muffler 34 and the cylinder head 10.

The bracket 42 shown in FIG. 2 is removably fastened to the upper wall 37 of the muffler covering 36 by means of the fastening members 45. Since the drive source 38 is removable, the maintenance of the drive source 38 is good. Also, removal of the drive source 38 allows change to the engine of a type having no auto choke function, and hence, the muffler covering 36 can be concurrently used on those different types of engine.

The bimetal 44 and the link member 40 are rotatably connected together through the link lever 58, and the link member 40 is engaged with the link lever 58. Accordingly, merely by engaging the link member 40 with the link lever 58, the drive source 38 and the choke valve 30 can be connected together, and hence, the assemblability of and the maintenance of the auto choke device 32 are good.

The general purpose engine E shown in and referred to in connection with the preferred embodiment is the vertical engine of a type in which the engine rotary shaft AX extends in the vertical direction. Accordingly, since the drive source 38 and the link member 40 is positioned above the engine, removal of the fan covering 2 makes it possible to access from above to the drive source 38 and the link member 40, and therefore, the maintenance of the auto choke device 32 is rendered to be good.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing embodiment of the present invention the heat shield 60 has been shown and described as operable to guide the cooling wind W to the point of connection between the muffler 34 and the cylinder head 10, the heat shield 60 may work well if the heat shield 60 is designed so as to block out the cooling wind W then flowing towards the bimetal 44 and, in this case, the cooling wind W can be guided to a desired site.

Accordingly, such changes and modifications are, unless they depart from the scope of the present invention as delivered from the claims annexed hereto, to be construed as included therein.

REFERENCE NUMERALS

2 . . . Fan covering
10 . . . Cylinder head
12 . . . Cooling fan
25 . . . Air intake passage
30 . . . Choke valve
32 . . . Auto choke device
34 . . . Muffler
36 . . . Muffler covering
38 . . . Drive source
40 . . . Link member
42 . . . Bracket
44 . . . Bimetal
45 . . . Fastening member
58 . . . Link lever 60 . . . Heat shield
62 . . . Point of connection
AX . . . Engine rotary shaft
E . . . General purpose engine
D . . . Gap
W . . . Cooling wind

What is claimed is:

1. A general purpose engine which comprises:
a cooling fan fixed to an engine rotary shaft;
a muffler to silence exhaust gases;
a muffler covering to cover the muffler; and
an auto choke device to control an opening of a choke valve in an air intake passage by the utilization of heat evolved from the muffler, wherein
the auto choke device comprises:
   a drive source, which is fitted to the muffler covering in a non-contact fashion to the muffler and exposed to an outer surface of the muffler covering; and
   a link member to connect between the drive source and the choke valve,
the drive source includes a bracket fitted to the muffler covering and a bimetal fitted inside the bracket, the bimetal being laterally disposed between the muffler and the muffler covering, and
the bracket includes a heat shield extending towards an inner side of the muffler covering and configured to block out a cooling wind then flowing towards the bimetal.

2. The general purpose engine as claimed in claim 1, wherein the bracket is fastened removably to the muffler covering by a fastener in a condition that the bracket is exposed from the outer surface of the muffler covering.

3. The general purpose engine as claimed in claim 1, wherein
the bimetal and the link member are rotatably connected together by means of a link lever, and
the link member is engaged with the link lever.

4. The general purpose engine as claimed in claim 1, wherein the heat shield extends towards a gap between the muffler and a cylinder head.

5. The general purpose engine as claimed in claim 4, wherein the heat shield is configured to guide the cooling wind towards a point of connection between the muffler and the cylinder head.

6. The general purpose engine as claimed in claim 1, wherein the engine rotary shaft extends in a vertical direction.

7. The general purpose engine as claimed in claim 6, further comprising a fan covering configured to cover an upper surface of the engine, which fan covering is made of resin material.

8. The general purpose engine as claimed in claim 1, the drive source is detachably fitted to a surface of the muffler covering lying along a plane that intersects with an axis of the engine rotary shaft.

9. The general purpose engine as claimed in claim 8, further comprising a fan covering configured to cover the engine from one side of an axial direction of the engine rotary shaft, wherein
the drive source is detachably fitted to a surface of the muffler covering, which surface is directed to the one side of the axial direction of the engine rotary shaft.

* * * * *